United States Patent
Calahan et al.

(10) Patent No.: US 7,920,482 B2
(45) Date of Patent: Apr. 5, 2011

(54) SYSTEMS AND METHODS FOR MONITORING INFORMATION CORRESPONDING TO COMMUNICATION SESSIONS

(75) Inventors: Marc Calahan, Woodstock, GA (US); Lynn Richard Akers, Smyrna, GA (US)

(73) Assignee: Verint Americas Inc., Roswell, GA (US)

( * ) Notice: Subject to any disclaimer, the term of this patent is extended or adjusted under 35 U.S.C. 154(b) by 1192 days.

(21) Appl. No.: 11/540,785

(22) Filed: Sep. 29, 2006

(65) Prior Publication Data

US 2008/0080386 A1    Apr. 3, 2008

(51) Int. Cl.
*H04L 1/00* (2006.01)
*G06F 15/16* (2006.01)
(52) U.S. Cl. .................. 370/252; 370/352; 709/227
(58) Field of Classification Search .......... 370/252, 370/352, 401, 465; 709/217, 227
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |

(Continued)

FOREIGN PATENT DOCUMENTS

EP    0453128 A2    10/1991

(Continued)

OTHER PUBLICATIONS

"Customer Spotlight: Navistar International," Web pae, unverified print date of Apr. 1, 2002.

(Continued)

*Primary Examiner* — Andrew Lee
(74) *Attorney, Agent, or Firm* — Lawrence A. Aaronson, PC

(57) ABSTRACT

Systems and methods for monitoring information corresponding to communication sessions are provided. A representative method includes: receiving information corresponding to the communication session; storing the information in long term storage; extracting a first portion of the information from the long term storage; populating a database with the first portion of the information such that the portion of the information is stored in the database in addition to being stored in the long term storage; determining that additional information corresponding to the communication session is required for use; and extracting an additional portion of the information from the long term storage.

10 Claims, 6 Drawing Sheets

U.S. PATENT DOCUMENTS

| | | |
|---|---|---|
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,946,375 A | 8/1999 | Pattison et al. |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0130945 A1* | 7/2003 | Force et al. ............... 705/40 |
| 2003/0144900 A1 | 7/2003 | Whitmer |
| 2003/0154240 A1 | 8/2003 | Nygren et al. |
| 2003/0169856 A1 | 9/2003 | Elazar et al. |
| 2004/0100507 A1 | 5/2004 | Hayner et al. |
| 2004/0165717 A1 | 8/2004 | McIlwaine et al. |
| 2005/0138560 A1 | 6/2005 | Lee et al. |
| 2006/0171380 A1 | 8/2006 | Chia |
| 2006/0190564 A1* | 8/2006 | Arnold ..................... 709/219 |
| 2007/0268908 A1* | 11/2007 | Linkola et al. .......... 370/395.2 |
| 2008/0002689 A1* | 1/2008 | Vera ......................... 370/389 |
| 2008/0031196 A1* | 2/2008 | Marathe et al. ............ 370/331 |
| 2008/0039210 A1* | 2/2008 | Junkin et al. ................ 463/42 |
| 2008/0066067 A1* | 3/2008 | Stimpson et al. ........... 718/100 |
| 2008/0077479 A1* | 3/2008 | Carter et al. ................ 705/10 |
| 2008/0130297 A1* | 6/2008 | Hui ........................... 362/352 |
| 2008/0178278 A1 | 7/2008 | Grinstein et al. |
| 2008/0201297 A1* | 8/2008 | Choi et al. ..................... 707/2 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"PriceWaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Arp. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
Needle. *Will The Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Rohde. *Gates Touts Interactive TV*, InfoWorld, Oct. 14, 1999.
Ross. *Broadcasters Use TV Signals to Send Data*, PC World Oct. 1996.
Stewart. *Interactive Television at Home: Television Meets the Internet*, Aug. 1998.
Wilson. *U.S. West Revisits Interactive TV*, Interactive Week, Nov. 28, 1999.
Notification Concerning Transmittal of International Preliminary Report on Patentability and Written Opinion of the International Searching Authority, dated Apr. 9, 2009.
Notification of Transmittal of the International Search Report and the Written Opinion of the International Searching Authority, dated Sep. 16, 2008.

* cited by examiner

US 7,920,482 B2

SYSTEMS AND METHODS FOR MONITORING INFORMATION CORRESPONDING TO COMMUNICATION SESSIONS

DESCRIPTION OF THE RELATED ART

Contact centers are staffed by agents with whom customers interact during communication sessions. Such communication sessions can be facilitated in various manners, such as by conventional telephones, voice over Internet Protocol (VoIP) phones, email and/or web-based chat.

Typically, a contact center uses monitoring software to track contact center activity. In this regard, monitoring software communicates with various applications that facilitate contact center activity. By way of example, these applications can include those associated with a private branch exchange (PBX), an email router and/or a customer relations management (CRM) application. These applications provide data corresponding to their respective operations to the monitoring application.

Monitoring applications use this data to build a model of call center activity. Such a model can then be analyzed for various purposes, such as determining whether service goals of the contact center are being achieved. Since such models are not standardized, and since data provided to such models tend to be provided in disparate formats, the data received typically is converted into a format that can be used by the model. However, converting the data inevitably results in some of the data being lost because the model only stores the data that is required by the model to perform its designated functions.

SUMMARY

In this regard, systems and methods for monitoring information corresponding to communication sessions are provided. An exemplary embodiment of such a system comprises a recording system and a data conversion system. The recording system is configured to communicate with a communication network. The recording system has a long term storage device and is operative to record an audio component corresponding to the communication session such that the audio component is stored in the long term storage device. The data conversion system is configured to communicate with the recording system and is operative to: receive information corresponding to the communication session; map at least a portion of the information to corresponding data fields of a database; and provide at least a portion of the information in the database to the recording system. A record of the communication session is stored in the long term storage device and is annotated with the portion of the information from the database.

An embodiment of a method comprises: receiving information corresponding to the communication session, at least some of the information being provided by one of the network switches; recording all of the information, provided by the communication network, pertaining to the communication session such that the information is stored in long term storage; and mapping at least some of the information recorded to corresponding data fields in a database such that the at least some of the information is stored in the database in addition to being stored in the long term storage.

Another embodiment of a method comprises: receiving information corresponding to the communication session; storing the information in long term storage; extracting a first portion of the information from the long term storage; populating a database with the first portion of the information such that the portion of the information is stored in the database in addition to being stored in the long term storage; determining that additional information corresponding to the communication session is required for use; and extracting an additional portion of the information from the long term storage.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

As will be described in greater detail here, several exemplary embodiments of systems and methods for monitoring information corresponding to communication sessions will be described. In this regard, an embodiment of such a system can alleviate some of the perceived shortcomings of conventional monitoring systems in which data oftentimes is lost as the data is converted to conform to a corresponding model of contact center activity. In this regard, in some embodiments, all of the information received by the monitoring system is recorded whether or not the current model of contact center activity will use all of the information. By recording all of the information received, updates to the contact center model can exploit this information by accessing the recorded information and then re-evaluating that information based on the updated model. This is in contrast to conventional systems in which information that was not converted for use by the previous version of the contact center model is not stored for later use and, thus, can not be re-evaluated.

Another potential advantage relates to troubleshooting of system implementations. In this regard, numerous applications typically are involved in implementing a contact center. As should be understood, these applications interface with various other applications and/or components resulting in a rather complex integration. In such an environment, troubleshooting typically involves acquiring the relevant applications, interfaces and/or components in order to evaluate any operational discrepancies. However, in contrast to this conventional methodology, since data pertaining to those applications, interfaces and/or components is recorded in some embodiments (and not discarded for failing to be required by the contact center model), this data can be used for performing troubleshooting. Thus, the applications, interfaces and/or components need not be acquired for performing the troubleshooting. In this regard, the recorded data can serve as a testing algorithm to simulate the actual inputs that led to the perceived operational discrepancy.

Figure 1:
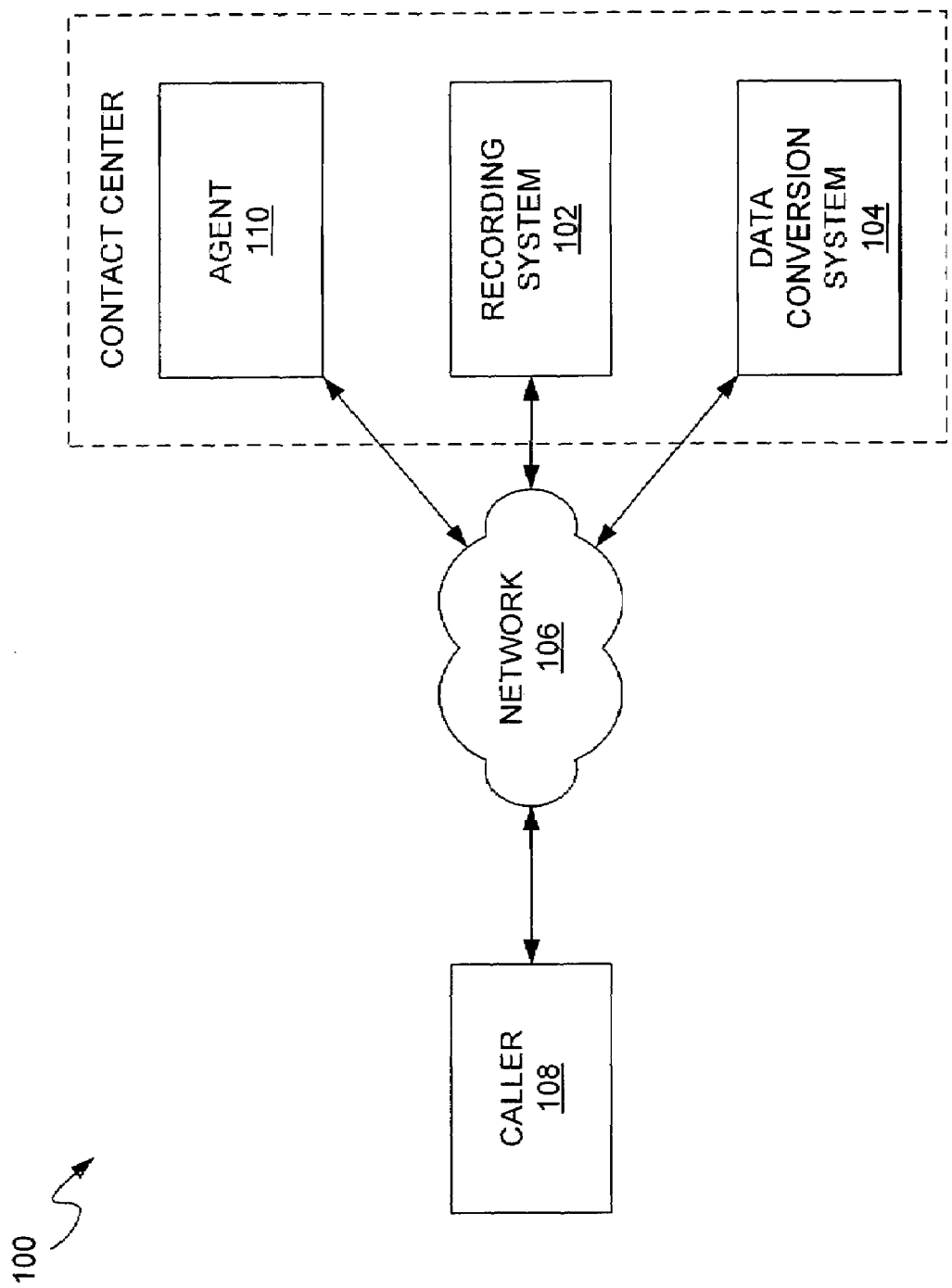
FIG. 1 is a schematic diagram of an embodiment of a system for monitoring information corresponding to communication sessions.

Referring now in more detail to the drawings, FIG. 1 is an exemplary embodiment of a system for monitoring information corresponding to communication sessions. As shown in FIG. 1, the system 100 incorporates a recording system 102 and a data conversion system 104, each of which communicates with a communications network 106. As a non-limiting, example, communications network 106 can include a Wide Area Network (WAN), the Internet and/or a Local Area Network (LAN). Notably, in this embodiment, the recording system and data conversion system are associated with a contact center.

In this regard, a contact center can optionally include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

In the embodiment of FIG. 1, system 100 also incorporates those applications, interfaces and/or components associated with facilitating a communication session between a caller party 108, e.g., a customer, and a called party 110, e.g., an agent of the contact center. In operation, one or more of the various applications, interfaces and/or components provide information to the recording system, so that audio corresponding to the communication session is recorded to long term storage.

The data conversion system also receives information from one or more of the various applications, interfaces and/or components that the data conversion system converts for use, such as in a model of contact center activities. By way of example, the model can incorporate a database that is structured to store selected data that can be used for various purposes, such as call recording (e.g., control and/or tagging), agent tracking (e.g., on break, ready to accept call) agent evaluation, call search and reporting.

Notably, in this embodiment, all information provided to the data conversion system that pertains to the communication session is recorded to long term storage, with at least some of that information also being used to populate the model. Thus, in contrast to conventional monitoring systems, this embodiment retains information that is not used by the model so that the information can be used at another time.

Figure 2:
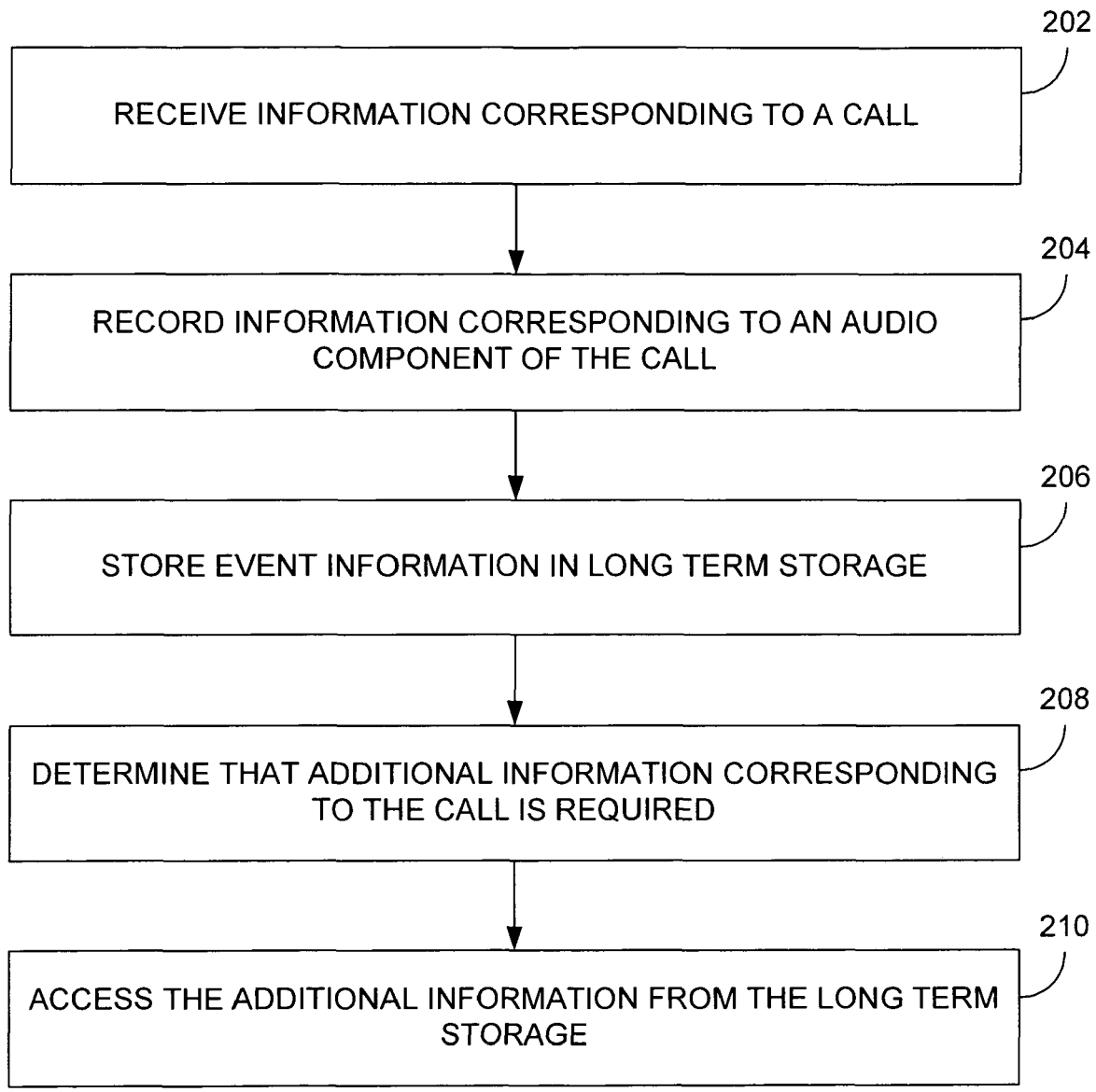
FIG. 2 is an embodiment of a method for monitoring information corresponding to communication sessions.

FIG. 2 is a flowchart depicting the functionality (or method steps) that can be performed by an embodiment of a system for monitoring information corresponding to communication sessions. Specifically, as shown in block 202, the functionality includes receiving information corresponding to a call. In this regard, a call is a discrete portion of a communication session that involves selected parties and/or events. For instance, a communication session that involves a customer and an agent can include multiple calls. By way of example, such a communication session can include a first call involving the customer and an interactive voice response (IVR) system of the contact center, a second call involving the customer being on hold in a queue designated by the IVR system, a third call involving an interaction between the customer and an agent, a fourth call involving the agent consulting with a second agent, and a fifth call involving a transfer of the customer to the second agent and subsequent interaction.

Additionally, it should be noted that the term call is not limited to telephone communications and can include various other forms such as email and web-based chat, for example.

In block 204, information corresponding to the audio component of the call is recorded, such as by a recording system that records the audio component to long term storage. In block 206, other information ("event" information) associated with the call is stored in long term storage. For instance, at least some of this event information can be used in a model that associates the event information with activities of a call center. In this regard, the event information, e.g., all information received except for the audio component, can be stored in a database. By way of example, a portion of the event information can be used to annotate the recorded audio component to create an annotated call record. Specifically, the call record includes annotations of events corresponding to the call that are identified by the model. Thereafter, such as depicted in block 208, a determination is made that additional information is required, such as for annotating the call record and/or for analysis purposes. Responsive to such a determination, the event information in long term storage is re-evaluated and, such as depicted in block 210, the additional information is accessed from the long term storage. Notably, the long term storage used to store the recorded audio component can be the same as or different from the long term storage used to store the event information.

Figure 3:
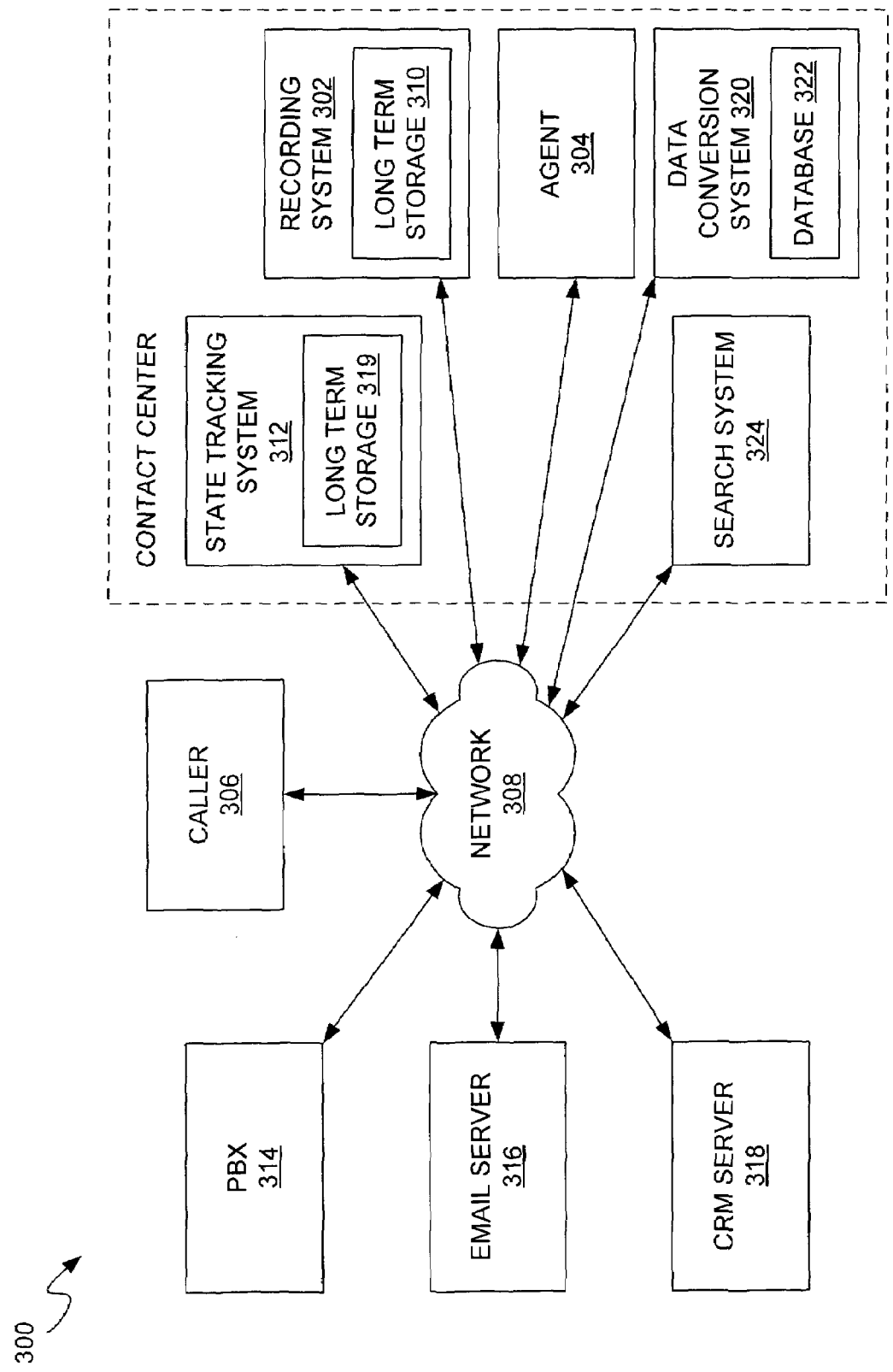
FIG. 3 is a schematic diagram of another embodiment of a system for monitoring information corresponding to communication sessions.

Another embodiment of a system for monitoring information corresponding to communication sessions is depicted in FIG. 3. As shown in FIG. 3, system 300 is deployed in a contact center and incorporates a recording system 302 that records information associated with a communication session, e.g., a communication session occurring between an agent 304 and a customer 306. By way of example, the recording system can record an audio component of the communication session. Communications network 308 facilitates the communication session. Notably, the recording system includes a long term storage device 310 that stores the information.

System 300 incorporates a contact center state tracking system 312 that monitors the various applications, interfaces and components of the contact center for contact center activity. In this regard, contact center activity is identified by a sequence of events, which typically are communication component-specific events, e.g., switch events. By way of example, each network switch involved in facilitating a communication session provides information corresponding to its state to the state tracking system 312 during a communication session. Thus, when the communication session is facilitated using IP packets, each network switch associated with routing of the IP packets can provide such information. For instance, a switch can provide information corresponding to several states, such as alerting, disconnect, establish and conference.

Information also is provided to the state tracking system by various other applications, interfaces and components. By way of example, third party data can be provided from a private branch exchange (PBX) 314, an email server 316 and/or a CRM server 318. The information provided to the state tracking system can be optionally stored by a long term storage device 319. In some embodiments, the long term storage device 319 records all of the information received by the state tracking system. In some embodiments, the information can be stored by the long term storage 310 or other such component.

A data conversion system 320 receives information corresponding to communication sessions, such as from the state tracking system. The data conversion system structures at least some of the information to correlate with activities embodied in a contact center model. In this regard, the contact center model includes a database 322 that contains various data fields for storing selected information pertaining to contact center activities. Notably, the conversion system populates the data fields of the database with information received pertaining to communication sessions. Based on an interpretation of this information, the data conversion system determines the activities that are occurring in the contact center. Notably, information that may not be presently interpreted as being associated with a contact center activity can be stored. That is, in some embodiments, this information also can be stored in the database.

Responsive to receiving information corresponding to a state and correlating that state with an event, the data conversion system provides information corresponding to the event to the recording system so that information corresponding to the event can be recorded. In some embodiments, the event is provided as tag or an annotation to a call record that is stored in the long term storage 310 of the recording system.

In order to facilitate the populating of the aforementioned data fields, a mapping procedure can be undertaken either manually, semi-automatically or automatically. The mapping procedure correlates discrete portions of the information received to one or more data fields of the database. An exemplary embodiment of a mapping procedure will be described later with reference to FIG. 4.

The embodiment of FIG. 3 additionally incorporates a search system 324 that is used to access information stored in the long term storage and/or in the database. In this regard, various search engines and/or techniques can be used to enable locating of information for various purposes such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more various functions such as receiving, capturing, intercepting and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence and compliance purposes, for example. Such integrated functionalities improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities. Referring back to the collections example outlined above, by using emotion and concept detection, companies can identify which customers are attempting to mislead collectors into believing that they are going to pay. The earlier the company is aware of a problem account, the more recourse options they will have. Thus, the speech analytics of the present disclosure can function as an early warning system to reduce losses.

An exemplary mapping procedure will now be described with respect to FIG. 4. As mentioned before, such a mapping procedure can be performed in association with a data conversion system so that received information can be correlated with the appropriately designated data fields of a database. In this regard, the left side of the diagram depicts information associated with an event ("TEvent") that is received by an embodiment of a data conversion system. Specifically, TEvent indicates an alerting event, with this information being provided by a telephony server. Notably, a telephony server is a server that functions as a network switch interface.

This information includes various segments of data. In particular, the following are provided: "OtherParty" data corresponding to the party making the call (e.g., a customer); "ThirdParty" data corresponding to an IVR system or other queue, for example; "ThisParty" data corresponding to the party whose phone is ringing (e.g., an agent of the contact center); "eventType" data corresponding to alerting; "Queue" data corresponding to the queue in which the caller was placed; "private" data corresponding to user specific data of the caller (e.g., customer number); and "extensions" data corresponding to switch specific data corresponding to the call. Notably, the private data includes other subsets of data. In this case two key/value pairs. It should also be noted that other data in addition to or instead of the data depicted in FIG. 4 can be provided.

Figure 4:
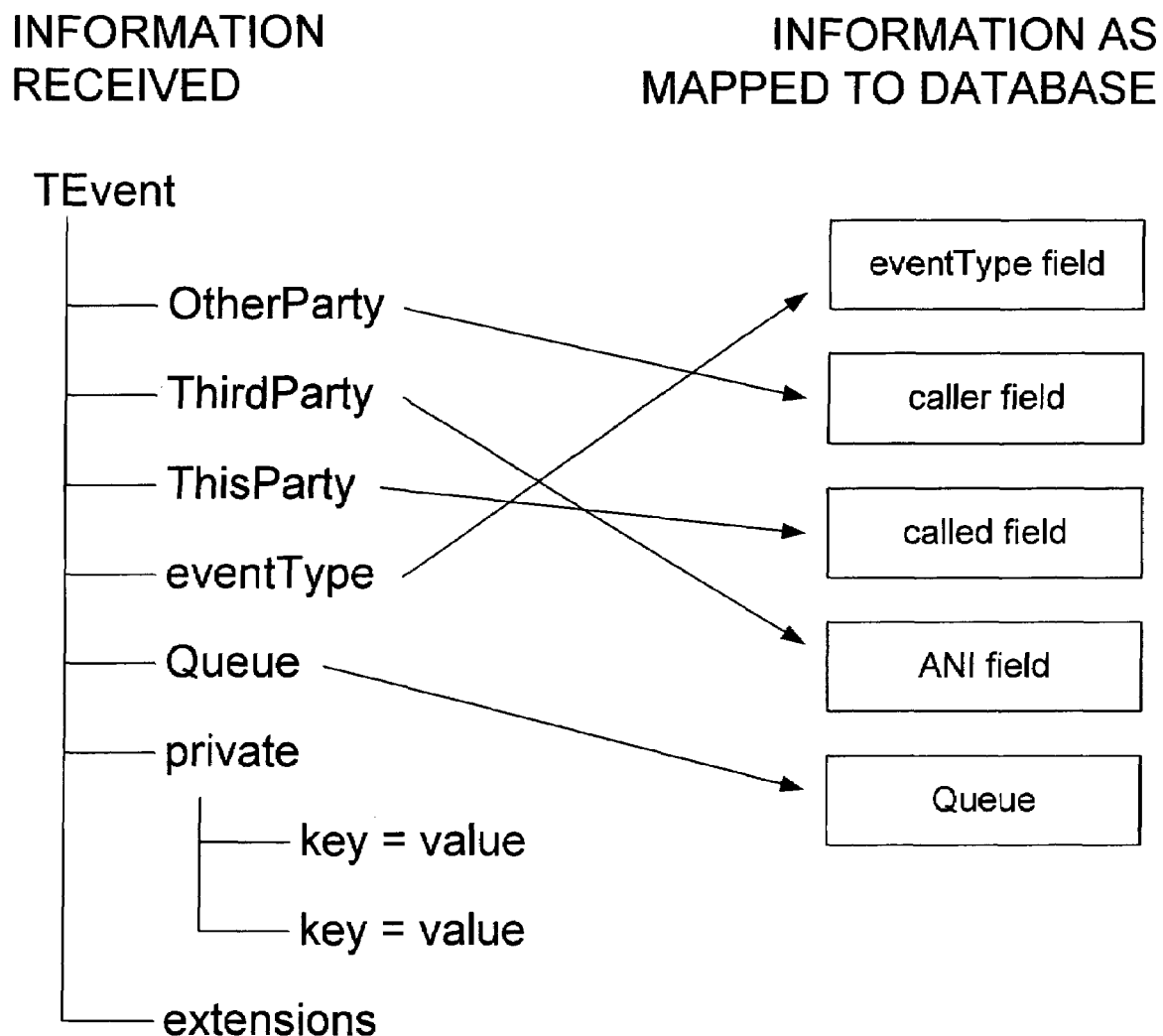
FIG. 4 is a flowchart depicting another method for monitoring information corresponding to communication sessions.

The right side of FIG. 4 depicts selected data fields of a database that is used to model contact center activity. In particular, the following data fields are included: "eventType," which corresponds to the type of event that has been identified; "caller," which corresponds to an identity of a caller of a communication session; "called," which corresponds to an identity of the called party of the communication session; "ANI," which corresponds to the phone and billing number of the caller; and "Queue," which corresponds to the queue of the call center to which the communication session is associated.

In operation, information-corresponding to a TEvent is mapped to the corresponding data fields of the database as indicated by the arrows. Notably, in contrast to conventional models that would lose the unmapped data, in this case the private and extension data, an embodiment such as described herein stores this information for late use. Specifically, the information is stored in long term storage and can be accessed for various uses, such as those depicted in FIG. 5.

Figure 5:
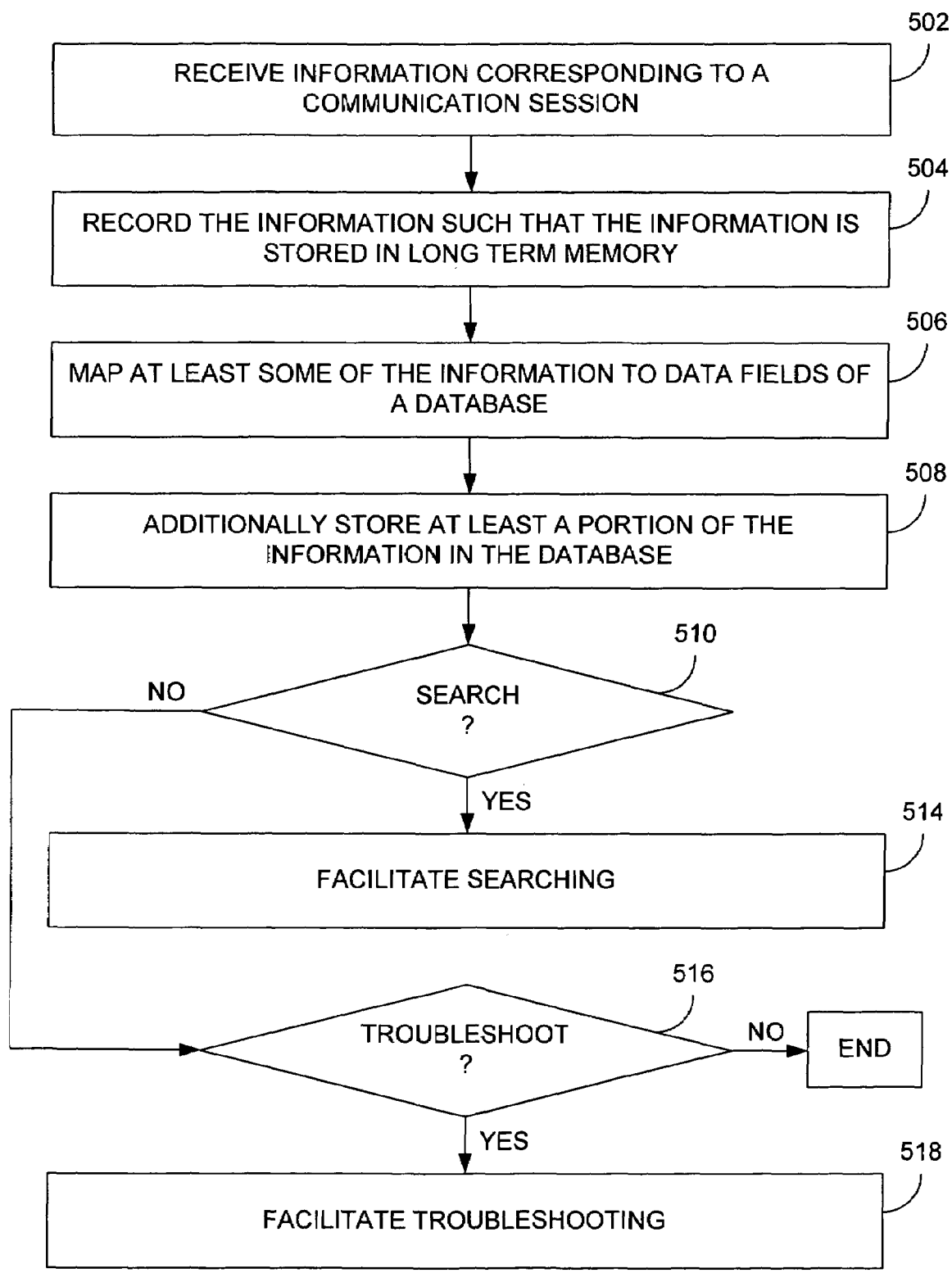
FIG. 5 is a diagram depicting mapping of information to a database.

In this regard, FIG. 5 depicts the functionality (or method) associated with another embodiment. As shown in FIG. 5, the functionality may be construed as beginning at block 502, in which information corresponding to a communication session is received, with at least some of the information being provided by at least one network switch of a communication network. In block 504, all of the information received is stored in long term storage. Notably, this can include recording the audio component of the communication session. In block 506, at least some of the information is mapped to corresponding data fields of a database. Thus, at least some of the information is stored in the database in addition to being stored in long term storage.

Thereafter, such as depicted in block 510, a determination is made as to whether searching is to be facilitated. By way of example, searching can be conducted in order to perform agent evaluation. If searching is to be facilitated, the process proceeds to block 512, in which search functionality, which involves providing access to information in the long term storage and in the database, is provided. If, however, searching functionality is not to be enabled, the process proceeds to block 514.

In block 514, a determination is made as to whether troubleshooting is to be facilitated. By way of example, troubleshooting can be conducted in order to determine a reason that a call was not recorded, which can be indicative of a state tracking system problem. If troubleshooting is to be facilitated, the process proceeds to block 516, in which troubleshooting (which involves the use of information stored in the long term storage as a simulation tool) is facilitated.

Figure 6:
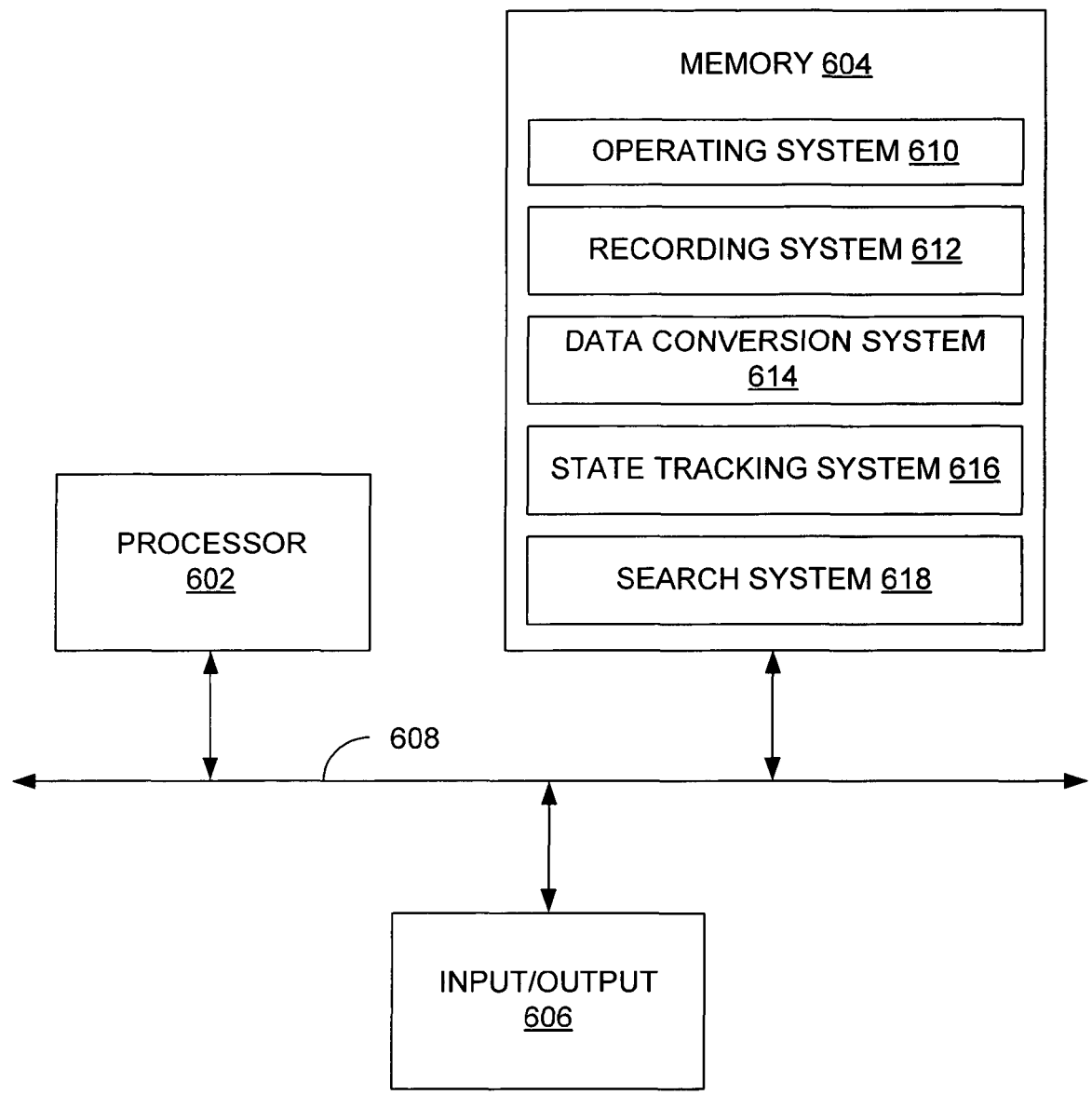
FIG. 6 is a schematic diagram of a system for monitoring communication sessions implemented by a computer.

FIG. 6 is a schematic diagram illustrating an embodiment of system for monitoring information corresponding to communication sessions that is implemented by a computer. Generally, in terms of hardware architecture, system 600 includes a processor 602, memory 604, and one or more input and/or output (I/O) devices interface(s) 606 that are communicatively coupled via a local interface 608. The local interface 606 can include, for example but not limited to, one or more buses or other wired or wireless connections. The local interface may have additional elements, which are omitted for simplicity, such as controllers, buffers (caches), drivers, repeaters, and receivers to enable communications.

Further, the local interface may include address, control, and/or data connections to enable appropriate communications among the aforementioned components. The processor may be a hardware device for executing software, particularly software stored in memory.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory includes an operating system 610, as well as instructions associated with a recording system 612, a data conversion system 614, a state tracking system 616 and a search system 618. Exemplary embodiments of each of which are described above.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

One should note that the flowcharts included herein show the architecture, functionality and/or operation of a possible implementation of one or more embodiments that can be implemented in software and/or hardware. In this regard, each block can be interpreted to represent a module, segment, or portion of code, which comprises one or more executable instructions for implementing the specified logical functions. It should also be noted that in some alternative implementations, the functions noted in the blocks may occur out of the order in which depicted. For example, two blocks shown in succession may in fact be executed substantially concurrently or the blocks may sometimes be executed in the reverse order, depending upon the functionality involved.

One should note that any of the functions (such as depicted in the flowcharts) can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that many variations and modifications may be made to the above-described embodiments.

All such modifications and variations are intended to be included herein within the scope of this disclosure and protected by the following claims.

The invention claimed is:

1. A method for monitoring information corresponding to a communication session between a caller party and a called party, the communication being facilitated by a communication network having network switches, said method comprising:
   receiving event information corresponding to the communication session, at least some of the information being provided by one of the network switches;
   recording all of the event information, provided by the communication network, pertaining to the communication session such that the event information is stored in long term storage;
   mapping at least some of the event information recorded to corresponding data fields in a database; and
   storing the at least some of the event information in the database such that the at least some of the event information is stored in the database in addition to being stored in the long term storage.

2. The method of claim 1, further comprising:
   determining that additional information, corresponding to the communication session and other than the information stored in the database, is to be accessed; and
   using the information stored in the long term storage to provide the additional information.

3. The method of claim 1, further comprising:
   using the information stored in the long term storage as inputs for troubleshooting of a software application used to monitor communications sessions.

4. A system for monitoring event information corresponding to a communication session between a caller party and a called party, the communication being facilitated by a communication network, said system comprising:
   a recording system configured to communicate with the communication network, the recording system having a long term storage and being operative to record the event information corresponding to the communication session such that the event information is stored in the long term storage device; and
   a data conversion system configured to communicate with the recording system and operative to map at least a portion of the event information that was recorded to corresponding data fields of a database and store a mapped portion of the event information in the database such that the mapped portion of the event information is stored in the database in addition to being stored in the long term storage device.

5. The system of claim 4, further comprising:
   a state tracking system configured to identify events associated with the communication session, the state tracker being configured to communicate information corresponding to events identified to the recording system such that the information recorded by the recording system comprises the information corresponding to events identified.

6. The system of claim 5, wherein the information corresponding to events comprise: caller party information, called party information and handling time.

7. The system of claim 4, further comprising:
   a search system communicating with the long term storage and with the database, the search system being operative to access information stored in the long term storage device and in the database responsive to a user input.

8. The system of claim 4, further comprising:
   means for accessing information stored in the long term storage and in the database responsive to a user input.

9. The system of claim 4, wherein the database is stored in the long term storage device.

10. The system of claim 4, further comprising at least one of: a quality monitoring module, a call recording module, a workforce management module, a performance management module, an e-learning module, a coaching module, and a speech analytics module.

* * * * *